United States Patent
Vasamsetti et al.

(10) Patent No.: US 8,320,261 B2
(45) Date of Patent: Nov. 27, 2012

(54) METHOD AND APPARATUS FOR TROUBLESHOOTING SUBSCRIBER ISSUES ON A TELECOMMUNICATIONS NETWORK

(75) Inventors: Satish Satya Vasamsetti, Danville, CA (US); Johan Casier, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 12/681,081

(22) PCT Filed: Jul. 21, 2009

(86) PCT No.: PCT/US2009/051300
§ 371 (c)(1),
(2), (4) Date: Mar. 31, 2010

(87) PCT Pub. No.: WO2010/011682
PCT Pub. Date: Jan. 28, 2010

(65) Prior Publication Data
US 2011/0122866 A1    May 26, 2011

Related U.S. Application Data

(60) Provisional application No. 61/082,498, filed on Jul. 21, 2008.

(51) Int. Cl.
*H04J 1/16* (2006.01)

(52) U.S. Cl. ...... 370/242; 370/252; 709/224; 379/22.03
(58) Field of Classification Search .......... 370/241–252, 370/261, 270, 395.2, 401; 709/223–229, 709/237; 379/9, 9.03, 9.04, 14.01, 22.03, 379/32.01, 32.05
See application file for complete search history.

(56) References Cited

U.S. PATENT DOCUMENTS

| | | | |
|---|---|---|---|
| 6,189,038 B1 | 2/2001 | Thompson | |
| 7,869,368 B2 * | 1/2011 | Stephan | 370/241 |
| 2003/0191989 A1 | 10/2003 | O'Sullivan | |
| 2003/0214963 A1 | 11/2003 | Moody | |
| 2007/0147324 A1 | 6/2007 | McGary | |
| 2008/0137549 A1 * | 6/2008 | Manthoulis | 370/252 |

FOREIGN PATENT DOCUMENTS

EP    0849911 A2    6/1998
* cited by examiner

*Primary Examiner* — Ricky Ngo
*Assistant Examiner* — Kan Yuen
(74) *Attorney, Agent, or Firm* — Haynes and Boone, LLP

(57) ABSTRACT

Methods, systems and computer readable media defining computer instructions for isolating subscriber and service issues on a service provider network methods by retrieving status information from active network elements of a service provider network, associating the status information with a subscriber session, call setup, or service, then displaying that information along with the KPI or SLAs associated with those active elements.

20 Claims, 11 Drawing Sheets

METHOD AND APPARATUS FOR TROUBLESHOOTING SUBSCRIBER ISSUES ON A TELECOMMUNICATIONS NETWORK

CLAIM OF PRIORITY

This application claims the benefit of U.S. Provisional Patent Application No. 61/082,498 titled "Method and Apparatus for Troubleshooting Subscribers on a Telecommunications Network" filed Jul. 21, 2008. This application also claims benefit to PCT application PCT/US09/51300 filed Jul. 21, 2009.

FIELD OF THE INVENTION

The invention generally relates to telecommunications systems analysis. More particularly, the invention relates to a system, an apparatus and a method for collecting, analyzing, displaying and troubleshooting issues on service provider networks from the standpoint of troubleshooting issues that are subscriber-based.

BACKGROUND AND DESCRIPTION OF THE RELATED ART

Service provider networks consist of segments which are geographically distributed, and functions which are best viewed technically as a series of layers, typically based on the seven-layer Open Systems Interconnection (OSI) model. When service provider networks provided access to web and e-mail programs, troubleshooting was limited and fairly simple, as there was little or no interaction between the programs driving the user's experience on the internet and the signals being sent between computers to make that experience possible. With the advent of such technology that allows video, voice and other time and frequency-sensitive technologies to be sent over service provider networks, the need for a stable network with few or no dropped packets is critical.

The advent of broadband has led to a large number of dependencies on the network for the application's end-user's experience. This makes troubleshooting more complex because there are interdependencies between different operating groups within a service provider network.

An approach to troubleshooting such service provider networks for subscriber issues is to diagnose issues by leveraging the knowledge of each technician within each layer. The technician then troubleshoots each layer using each Element Management Server (EMS) or Command Line Interface (CLI) independently. Then the information between technicians is manually correlated through communication between technicians who are busy troubleshooting each network element.

This approach does not work well for distinguishing between problem-specific and subscriber-specific issues is difficult. First, if there is a problem with any layer of the service provider network, then there is no use troubleshooting any layer above that or any subscriber-based issues. But it would take multiple technicians to determine that there is a problem in a given layer. A problem in lower layers would propagate to higher layers, and so helping a subscriber would be fruitless. For instance, a subscriber connecting to an Internet Protocol (IP) Network will get an authentication failure or a connection timeout. This failure could be due to a transport network failure, failure of the Authentication, Authorization and Accounting (AAA) network element, or from the AAA server being down, and so on. Also all elements in layers below IP such as the Radio Frequency (RF) layer would show no failures.

Second, if it is determined that the service provider network is not working properly, it may or may not affect a given subscriber if that subscriber is not being routed through any of the failed network elements. Determination of the path a particular subscriber is using requires manual correlation of messages through various nodes.

Third, subscriber-specific issues require correlation of call flow or control messages from different network elements across the service provider network. One way to accomplish this correlation would be to have multiple technicians, each monitoring the layer associated with their expertise (RF, IP, Applications, etc), and then through manual communication troubleshoot the subscriber's issues. This is not an efficient use of resources as each technician has to perform some level of diagnostics before communicating with the others. Isolating a problem in a network around a specific subscriber then becomes both a time-consuming and resource-consuming process.

Fourth, as problems are found, vendors who have little time or motivation to write detailed explanations and troubleshooting guides instead return cryptic diagnostic codes to the operator via the EMS or the CLI. The technician must in the best case look it up in a book if to provide a human-readable explanation, in the worst case contact the vendor who then may need to find an engineer to look at the source code to determine what the diagnostic code means and possibly recommend a course of action.

Another issue is the scalability of the manual troubleshooting techniques. As the complexity of the network has grown, there is a need for more and more people to become involved in troubleshooting each subscriber's issues. As the number of subscribers increases, the use of more and more technicians to troubleshoot network problems will eventually use up the resources for a given problem. Further, a given network may have different implementations of a given element from different vendors, making the troubleshooting even more complex.

SUMMARY OF INVENTION

Broadly speaking, the present invention fills these needs by providing: methods, systems and computer readable media defining computer instructions for retrieving status information from active network elements of a service provider network, associating that status information with a subscriber session, call setup, or service, then displaying that information along with KPI or SLAs associated with the active elements.

It should be appreciated that the present invention can be implemented in numerous ways, including as a process, an apparatus, a system, a device or a method.

BRIEF DESCRIPTION OF THE DRAWINGS

The present invention will be readily understood by the following detailed description in conjunction with the accompanying drawings. To facilitate this description, like reference numerals designate like structural elements.

Figure 1:
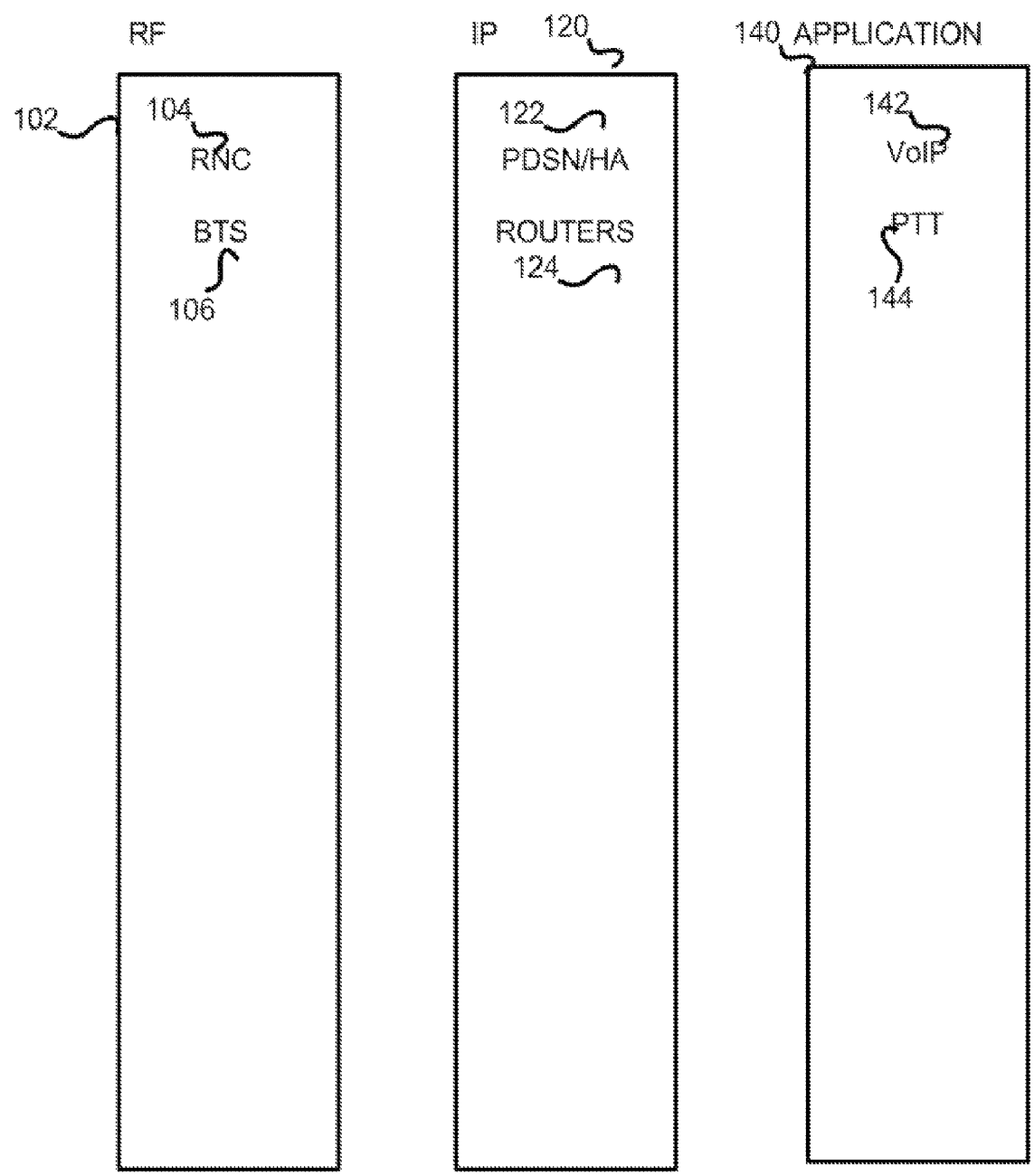
FIG. 1 illustrates a service provider network as a collection of layers which is processed by a collection of network element types.

The figures are provided in order to provide a thorough understanding of the present invention. The figures should not be construed as limiting the breath of the invention in any manner.

DETAILED DESCRIPTION

A method and apparatus for troubleshooting and diagnosing subscriber-based problems on a service provider network is disclosed. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in details in order not to unnecessarily obscure the present invention.

A service provider network includes a collection of interconnected service-affecting or subscriber-affecting nodes and logical links between those nodes. As used herein, the term 'subscriber-affecting node' is a component of a service provider network with which a subscriber has a direct interaction with, such as a node for applications or authentication. As used herein, the term 'service-affecting node' is a component of a service-provider network which is required to support a specific-service. Each subscriber-affecting or service-affecting node includes an interconnected set of homogeneous network elements which occupy IP addresses in a pre-defined range. As used herein, the term 'network element' means a facility or equipment used in the provision of a telecommunications service. A service provider network can be broken down geographically into a multiplicity of areas, such as a part of a city, a city, or part of a state. The area where the technicians who are assigned to troubleshoot an issue are starting from is referred to as the home area, the others are referred to as foreign areas. As used herein, the term 'node' without any qualifiers refers to either subscriber-affecting or service-affecting nodes.

Network elements may support one or more layers of the service provider network. Examples of layers typically supported by such a network are the Physical Layer, Data Link Layer, Internet Layer, and Session/Application Layer. The service provider networks may be wireless, such as cellular networks, or wired, as in cable or Digital Subscriber Line (DSL) networks.

As used herein, the term 'logical link' is an interconnection between two nodes. The logical link may include one or more physical elements, such as switches or repeaters.

Each network element can be controlled or managed by an Element Management System (EMS). The EMS associated with a given network element is proprietary to the vendor that manufactures the network element, although the EMS for a given type of network element will provide the same or similar functionality to that of other vendor's EMS for the same type of network element.

Each EMS provides the same type of information as any other EMS, but the specific details will vary from one EMS to another. For instance, every EMS will provide information associated with that type of network element such as its unique identifier, its network identifier, its type, the manufacturer, and its' Fully Qualified Domain Name (FQDN).

A network element can also be accessed through a proprietary command line interface (CLI). These communications links enable a trained specialist to troubleshoot issues on the network from the standpoint of the functionality offered by that network element. As each network element tends to process signals in one layer of the network signal model, a technician would tend to look at that layer of the service provider network across one or more network elements and network element types. Therefore, a technician diagnosing a problem in the Physical Layer would look at the network elements which process Radio Frequency (RF) signals, a technician whose job it is to diagnose problems in the Internet Protocol (IP) layer would look at network elements associated with the IP Layer and so on.

Further, most service provider networks are built on more than one vendor's products. This improves reliability but increases complexity as each technician must be trained on each EMS and CLI for each vendor's network element.

Service provider networks are accessed via Access Terminals (AT) such as computers or cell phones. A subscriber is a unique AT which is accessing the network over one or more subscriber sessions. A subscriber session is a time-bounded interaction with the network which begins with a sequence of messages called a call setup that is specific to the type of network (wireless, DSL, Cable) and that may end with a sequence of messages, a timeout, or some other network event which indicates the end of a call.

During call setup, a specific route through a series of network elements is defined for the call. The network elements that control this routing can be commanded to report the set of network elements within subscriber-affecting nodes used for the call, the time when the switching is performed, and the time when the call is ended. That way, the time of a specific subscriber session can be determined and the network elements associated with sessions can be associated with the specific session. Independent of the call setup reporting, network elements can be commanded to report status such as CPU utilization, status of process, bit error rate, and so on. This status information can be collected at regular intervals or on request if the call is being analyzed while it is active. This status information can be stored along with the call start and stop times and the set of network elements associated with the call. Once the session is correlated to the network elements and logical links it is routed through, the status of the network elements can be determined during the time frame of the call.

The system can also be setup such that when a specific subscriber connects during a specified timeframe, more detailed or frequent status collection from those associated network elements is executed.

In one or more embodiments, the data associated with the subscriber sessions, including start time, end time and routing information is stored in a database. In one or more embodiments, the data associated with the status of each network element is associated with that element and time-stamped. The data associated with the subscriber session can then be correlated with the status of the network elements within the subscriber-affecting nodes.

In one or more embodiments, the apparatus will provide multiple types of views of the network. In one or more embodiments, a user can change his view of the network from one view type to another to view different parts of the network in different contexts and gain specific information necessary to troubleshoot that part of the network. The Unified Service View shows a topology of al network elements and server used in supporting services such as VoIP, Video, Gaming, and enabling subscriber sessions. The Subscriber View narrows this topology to only those specific network elements and servers that enable a subscriber session. A Transport View shows the specific network elements which logically connect two service nodes. In one or more embodiments, the transport view may be limited to showing the path for a specific protocol such as BGP, Layer3 (router view), Layer2 (switching view) or VLAN view.

Figure 2:
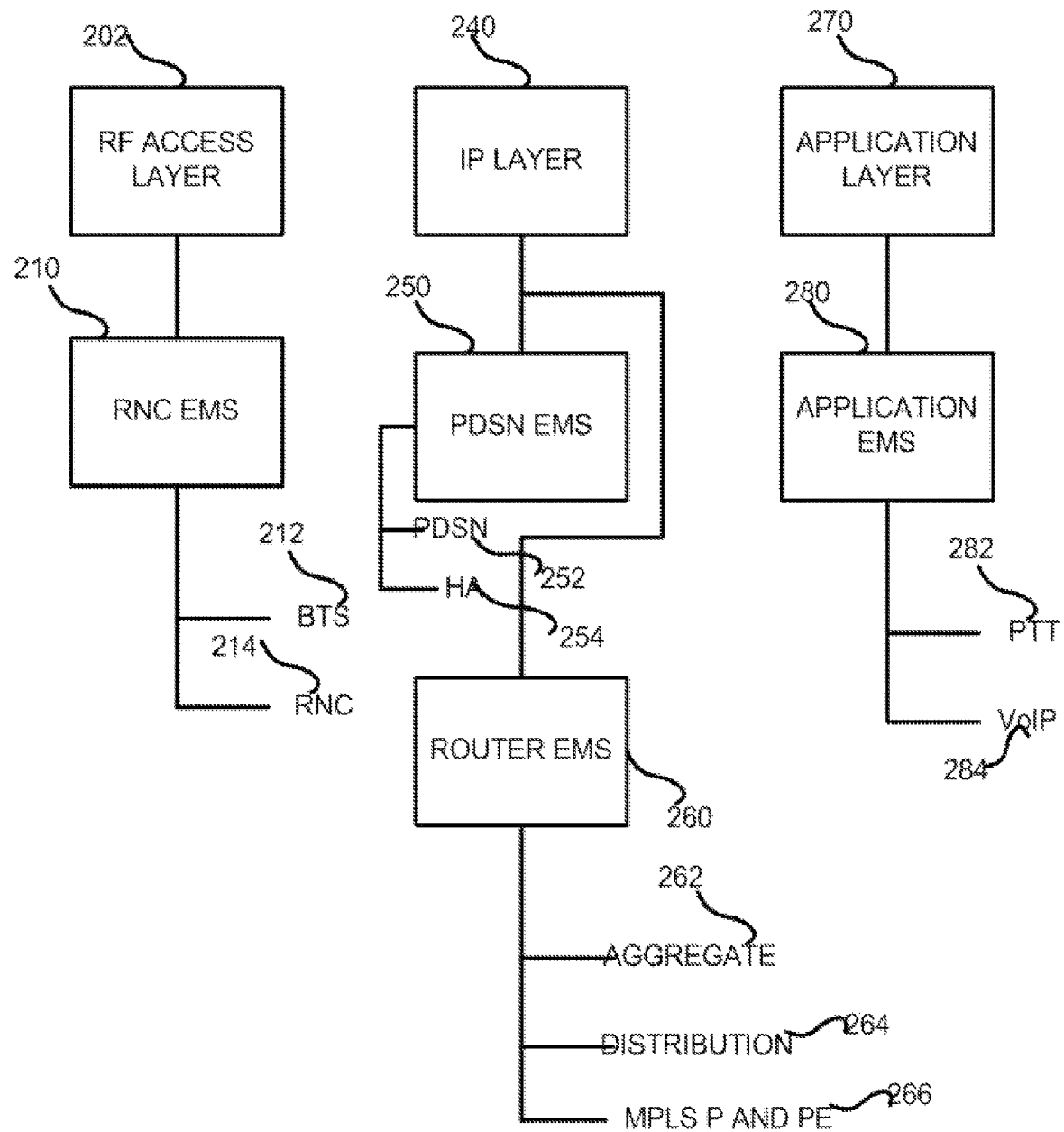
FIG. 2 illustrates how, in the prior art, technicians with different expertise would communicate to correlate signals across the layers of the service provider network.

The Unified Service View enables the operator to discover and display subscriber service-affecting network elements. The Unified Service View shows an interconnected collection of subscriber-affecting or service-affecting nodes and logical links. Note that a subscriber-affecting node which consists of a single network element is shown on all views as just that network element to avoid confusion. As shown in FIG. 1, the view of the network focuses on the different network layers 102, 120, 140. Each layer processes a specific type of signal with specific characteristics. For instance, RF layer 102 processes radio signals, IP layer 120 processes TCP/IP or similar digital signals and the application layer 140 processes requests to custom applications such as VoIP 142. An engineer called in to troubleshoot a problem would most likely focus on a layer at a time as shown in FIG. 2. For instance, a technician working on the Radio Network Controller (RNC) EMS 210 in the RF layer 202 communicates with other technicians working on other layers 240, 270 as he gathers new information.

Through the Unified Service View, Key Performance Indicators (KPIs) and service-affecting parameters such as routing hops can be displayed and monitored. The Unified Service View can be used by an operator to identify and isolate issues that can impact subscriber services.

Failure of a network element can then be defined through KPIs, the status of critical software processes, or the status of critical hardware components. The failure of a logical link can be defined in terms of ranges of values that measurements should fall into. These measurements include but are not limited to routing hops, round trip delay, link utilization, and last activity monitoring. Last activity monitoring is, for a well-balanced network, the expected time between the receipt of certain service-related messages that should be flowing across a link; too long a delay could indicate a failure of a component.

Figure 3:
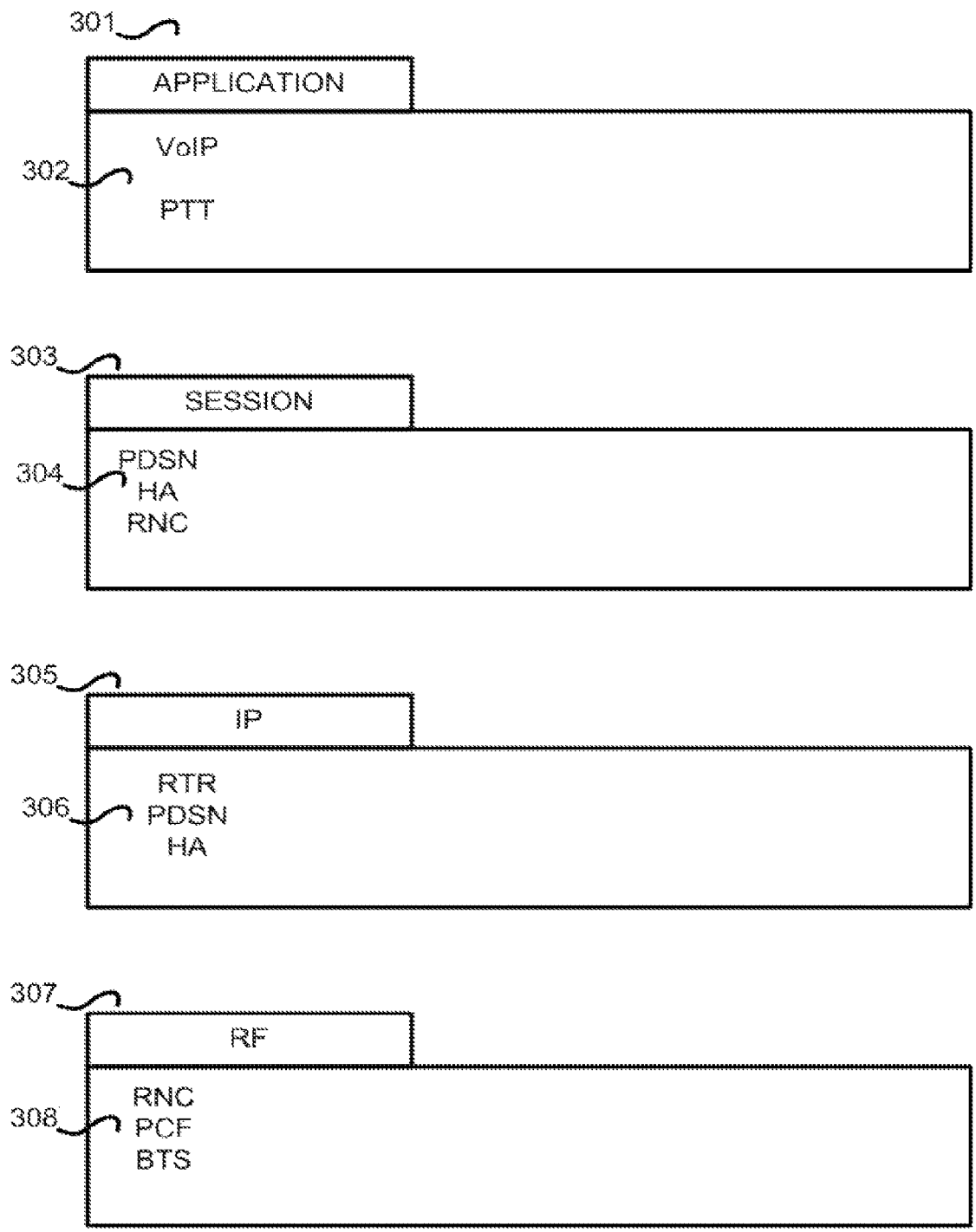
FIG. 3 illustrates the network layers with examples of network elements associated with those layers in a service provider network.

A narrow view of the service provider network by layers would independently show whether or not it is functional for that layer 301,303,305,307, as shown as FIG. 3. For instance, if the Session layer 303 were down, then anything in the Application layer 301 would fail, although diagnostics would show that all of the software within each network element was functional. In a Unified Service View of the service provider network, having any lower level network layer fail would mean that the upper levels would fail, regardless of whether or not there were issues with that layer.

Figure 4:
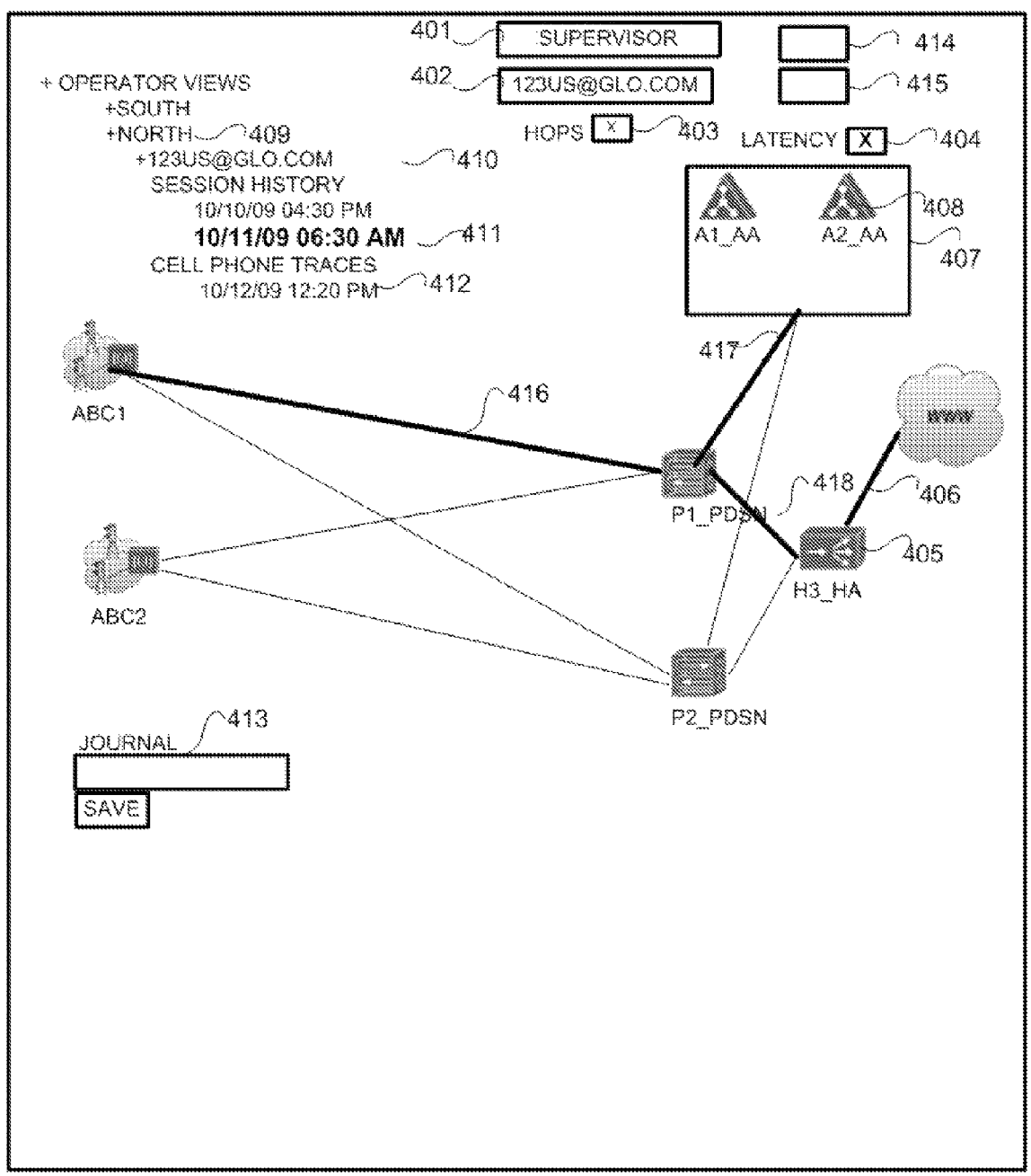
FIG. 4 illustrates a display of a Unified Service View of a service provider network in accordance with one or more embodiments of the present invention.

An embodiment of the Unified Service View of the service provider network is shown in FIG. 4. The Unified Service View shows each subscriber-affecting or service-affecting node and associated transport links. For example, a particular subscriber-affecting node may be functional on all layers or just up to some layer. Knowing quickly that specific subscriber-affecting nodes are down would reduce diagnostics significantly, since no subscriber analysis would help if a subscriber-affecting node that a subscriber goes through is down.

In one embodiment an operator would login successfully and select the Unified Service View. The current operator would be shown 401, with access to different features dependent on whom that operator is. Initially, there would be a list of operator views limited to views of the known service provider network areas 409, as no call flows or subscribers had been declared. The known service provider network is captured based on some stored "seed" configuration information provided by an operator. This configuration information would include the IP address or range of IP addresses, access layer type such as Secure Shell (SSH), Telnet, or Simple Network Management Protocol (SNMP), and security code associated with the primary network element type of that service provider network type, such as a PDSN for a wireless network. The system would then attempt to make contact and identify the set of PDSNs in order to obtain information about that network element as well as the network elements that they connect to. In one embodiment, the information about what type of network elements each network element connects to is contained in a model called the Network Model. The Network Model defines the interconnection between generic element types, the types specifically identified for each type of network (wireless 3G, cable, DSL, etc). Based on the model, the process can query other network elements for information about themselves and the elements they connect to, and so forth. In one or more embodiments, the path which a particular session or call trace travels through can be emphasized for display to the user 416, 417, 418, 406. In other embodiments, only those paths and the elements which are interconnected by them associated with a particular session or call trace are displayed.

In another embodiment, the information that is being displayed can be formatted into a message for transfer to an external system for processing or display.

Sequence for discovering and building a network topology is as follows. The operator enters the security information required to access the network. For each subscriber-affecting or service-affecting node, the operator enters the network element type, the IP addresses or range of addresses, and whether the element is home (part of the home area) or foreign (part of another area) into a stored configuration. Once the information is entered, only if a range of IP addresses was given, the software performs a ping, ssh, and secure FTP (sftp) on all elements entered to validate the connections. If a unique IP address was given the IP address is assumed to be correct. Another embodiment would use software like SNMPGet to validate the connection. The software will then query each network element through its CLI or EMS to determine the topology of the network around it. The software would then query and display the input, output, and management port IP addresses associated with each element, as well as vendor type (if available). The software could capture and display latency and packet delays between each pair of elements in the network. Typical delays calculated would be the delay between the Base Transceiver Station (BTS) and the RNC, the delay between the RNC and the PDSN, the delay between the PDSN and Home Agent (HA), and the delay between the HA and AT. In one embodiment, the operator can select two network elements and enter the maximum allowed delay between them, which can then be compared to the current delays to indicate a network problem.

The apparatus communicates with the EMS for each element through a standardized Application Programming Interface (API), or standardized CLI. This way, it is possible for third party diagnostic tools to be added to the part of the apparatus that drives the various views to extend the functionality provided by this invention.

Further, the access layer is separated from the API such that access to the EMS is protocol-independent, again making it cost effective to support third-party software and extend the system as needed.

A subscriber is declared 402 and searched for 415. The subscriber can be declared in any way that the service provider network would understand it. Typically this declaration is either an IP address or a Network Access Identifier (NAI). The search for a subscriber is executed using an algorithm that starts with the Home network elements, only going to the foreign elements if the subscriber cannot be found. In one embodiment the operator can limit the search to one or more areas of the network. In one embodiment, if the subscriber cannot be found in either the home or foreign areas of the service-provider network, then a message could be displayed to the operator indicating that the subscriber cannot be found or that the subscriber is not connected to the network. In another embodiment, the operator is prompted to search foreign network elements before doing so to make the search more efficient (ie. If the operator knows where the subscriber is and that he should be picked up by the home network, then no use continuing the search).

If the subscriber can be found, he would be placed in a list associated with the network area which is associated with the subscriber-affecting nodes his signal is passing through 410. At that point the subscriber sessions would be available to be analyzed. The time window during which subscriber sessions are available are dependent on the configuration of the system as to the amount of data held for processing. For a given subscriber, one could then analyze the call setup 412 associated with each subscriber session 411. At any time, an operator can enter a journal entry 413, which can later be correlated to specific events that are happening within the service provider network or for a specific subscriber. The Unified Service View shows one or more subscriber-affecting nodes 405 and logical links 406. A subscriber-affecting node is a container 407 for one or more network elements 408 which may be shown within each subscriber-affecting node. In one embodiment, a subscriber-affecting node containing a single network element may be shown as if the network element were directly connected to the network. In one embodiment, the level of detail shown on the Unified Service View may be modified, so that routing hops between logical links may or may not be displayed 403 and the latency across each logical link is also either displayed or not displayed 404.

Figure 5:
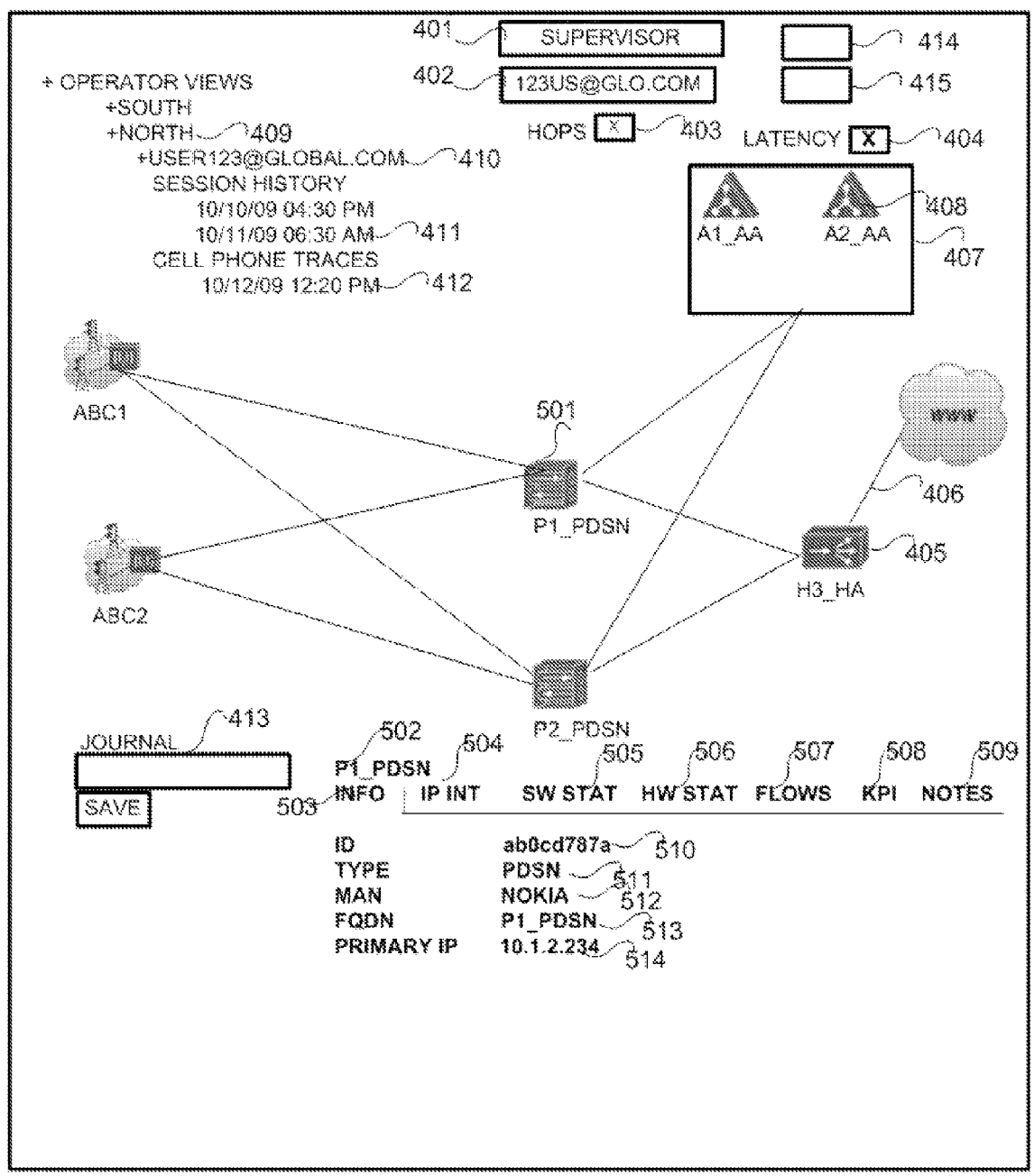
FIG. 5 illustrates a view of a selection of subscriber-affecting nodes in accordance with one or more embodiments of the present invention.

In one embodiment, when a subscriber session 411 is selected on the Unified Service View, the logical links and network elements associated with that subscriber session are emphasized on the display to show the network elements and links associated with that particular subscriber session. FIG. 5 shows an embodiment of that display. It also shows how one can select a specific element and get more details on it. In this instance, a PDSN labeled p1_pdsn is selected 501 and the details appear in the bottom of the screen, including the name of the element selected 502. The information displayed will vary with the element selected and is configured in the stored software configuration. In this example the AT information is specific to the PDSN 503. For all elements there will be IP interfaces 504, software status 505, hardware status 506, KPI 508, and Notes 509, which gets updated when notes are added using the journal 413 while the element 501 is selected.

In one embodiment, one can configure the Unified Service View to provide a snapshot of the current network delays, or continuous monitoring over a period of hours or days.

The subscriber view allows one to view a portion of the entire service provider network limited to that portion which the subscriber signals travel through for a specific subscriber session. In one embodiment, the operator selects a subscriber session from a list of specific subscribers who he searched for and found on the network, then on selecting the subscriber, only the nodes and links from the display that the particular subscriber is using are shown in the subscriber view.

Figure 6:
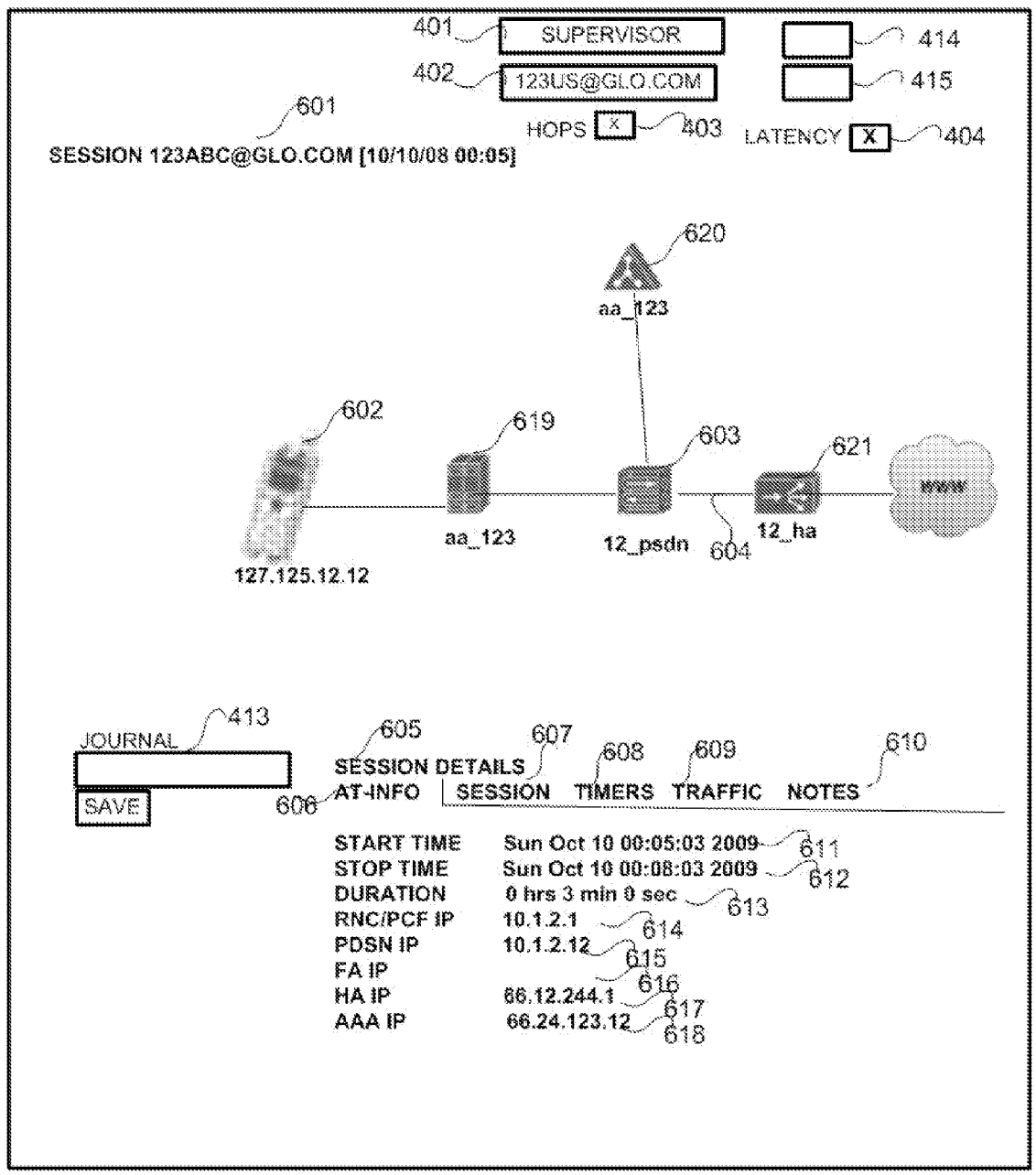
FIG. 6 illustrates a subscriber session view in accordance with one or more embodiments of the present invention.

FIG. 6 shows one embodiment of the subscriber view. The subscriber view would show the operator which subscriber path he is viewing 601. The main part of the display would still be visible to enable the operator to navigate back to one or more unified network views, another subscriber, another subscriber session, etc. The main part of the display shows the network as it supports this subscriber. For a typical wireless network, as defined in the stored software configuration, this would include the AT 602, Packet Control Function element (PCF/RNC) 619, Packet Data Serving Node element (PDSN) 603, Authentication Accounting and Authorization element (AAA) 620, and the Home Agent element (HA) 621. For a wired or for future expansion of the service provider network, this list would change and/or expand as needed by modifying the stored software configuration and data models.

Also shown in FIG. 6 is an embodiment of the details associated with a subscriber on a wireless service provider network. This includes information about the AT 606, subscriber Session information 607, information about any timers associated with this subscriber 608, traffic shaping 609, and any notes which are made during this diagnostic session 610, time stamped through the journal 413. The information about the AT 606 would include assigned IP, manufacturer type, and software version. The subscriber session information 607 would include the start 611 and end time 612 of the subscriber session, the duration of the subscriber session 613, the IP address of the PCF 614, the IP address of the PDSN 615, the IP address of the Foreign Agent (FA) 616, the IP address of the HA 617, the session type as a standard representation such as Session Initiation Protocol (SIP) or Mobile Internet Protocol (MIP) and the IP address of the AAA 618. The timer information 608 would include an inactivity timer, lifetime timer, MIP re-registration timer.

Figure 7:
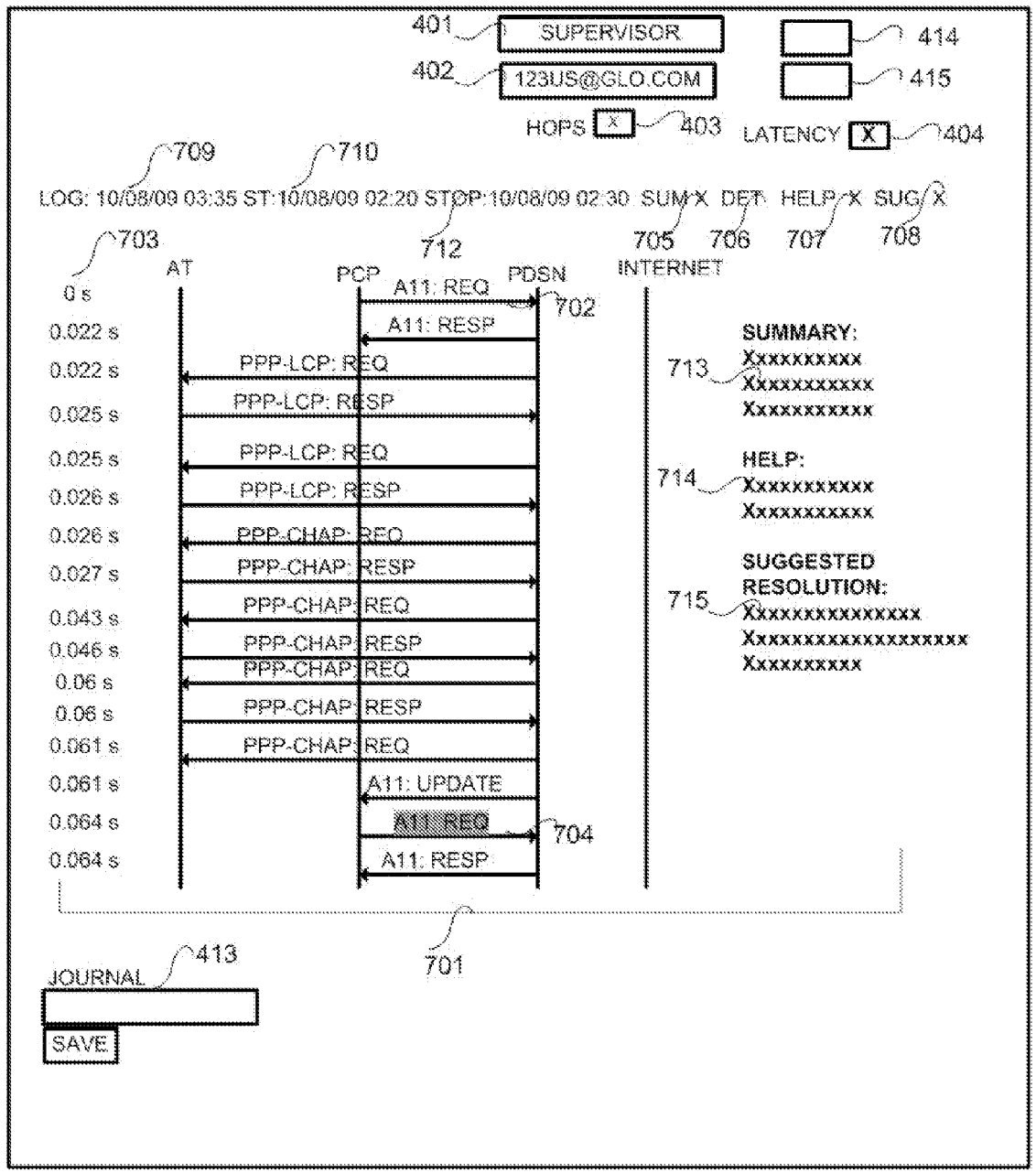
FIG. 7 illustrates a call setup view in accordance with one or more embodiments of the present invention.

The Call Setup Time View enables one to view the sequence of messages associated with a call setup for a particular subscriber session. It does this by auto-correlating subscriber call messages from different network elements including VoIP and SIP messages to determine the messages associated with a particular call and its sequence. In one embodiment, the Call Setup Time View displays the actual and delay budget times for each message. The results are displayed to the operator in correlated views, as shown in FIG. 7.

The first part of the view 701 shows the sequence of messages, including the identification of the message 702 and the time it took to be processed 703. In another embodiment, time since start of call setup could be shown as well. In another embodiment, the time budgeted (or time over which an error may have occurred) can be displayed as well.

The second part of the view shows the details of the message currently selected in the first view. If the message was successful, this may just be the summary 713. If it failed, it could be the status 713, or the status 713 and the troubleshooting information, and the details of the failed response. The troubleshooting information can include help 714, which details what went wrong, and suggested resolution 715, which gives the operator details of how to resolve this problem. The operator may select to display the summary 705, message detail 706, help 707, and suggested resolution 708 at any time by selecting one or more of these at these selectors.

In one or more embodiments, the call setup information can come from messages from the PDSN and HA in a wireless environment, the BRoadband Access Server element (BRAS) in a non-wireless environment, and every other network element which enables subscriber sessions such as RNC, AAA, and the Policy Server. The messages are captured via components which monitor the element traffic and placed into stored logs. The data can either be searched for via stored logs or displayed via a trigger.

In one or more embodiments, the Call Setup View would capture the following messages during call setup: The Data Link Layer messages between the RNC and PDSN; Data Link Layer messages between the AT and PDSN for wireless networks such as Point-To-Point (PPP) and Internet Protocol Control Protocol (IPCP) messages, or messages between the Home Customer-Provided Equipment (CPE) and BRAS; application related messages between AT and PDSN or AT and SIP Server; SIP/MIP messages between PDSN and HA; MIP messages between AT and HA; AAA messages between PDSN and AAA server; AAA messages between HA and AAA server; SIP messages between the AT and SIP Server; and policy messages between the policy enforcer (PDSN) and Policy server.

Every protocol has its own set of error codes associated with it, which may or may not be documented. Some error codes are defined by a standards body such as 3GPP, 3GPP2, IETF, and RFC's. The standards' codes will have some documentation associated with them. In addition, there will also be vendor-specific codes that may or may not be documented. During the call setup process, a network element may generate a protocol-specific error code and may not provide any details or plausible explanation. The knowledgebase is used to translate the cryptic protocol messages into English, along with providing suggestions that can be used to rectify the error. One embodiment would include separate fields for a description of the problem, cause of the problem, and how to troubleshoot the problem. Another embodiment would allow operators to update the knowledge base with information they discover as they troubleshoot as well as being able to use content provided by other sources.

The knowledge base is stored on computer-readable media. When an error code is contained in a message intercepted from an EMS or a response to a CLI command, the apparatus makes a request to the knowledge base to get a human-readable message to display to the operator. Depending on operator settings, this message could include a multiplicity of fields of different types of information associated with the error code. In one embodiment, the display of different types of information is selectable by the operator.

One embodiment would be a read-only media that can be updated on a subscription basis. Another embodiment could be storage on writeable media where an operator may update it. Another embodiment could be storage on a writeable media where it can be updated via the Internet and/or an operator.

Figure 8:
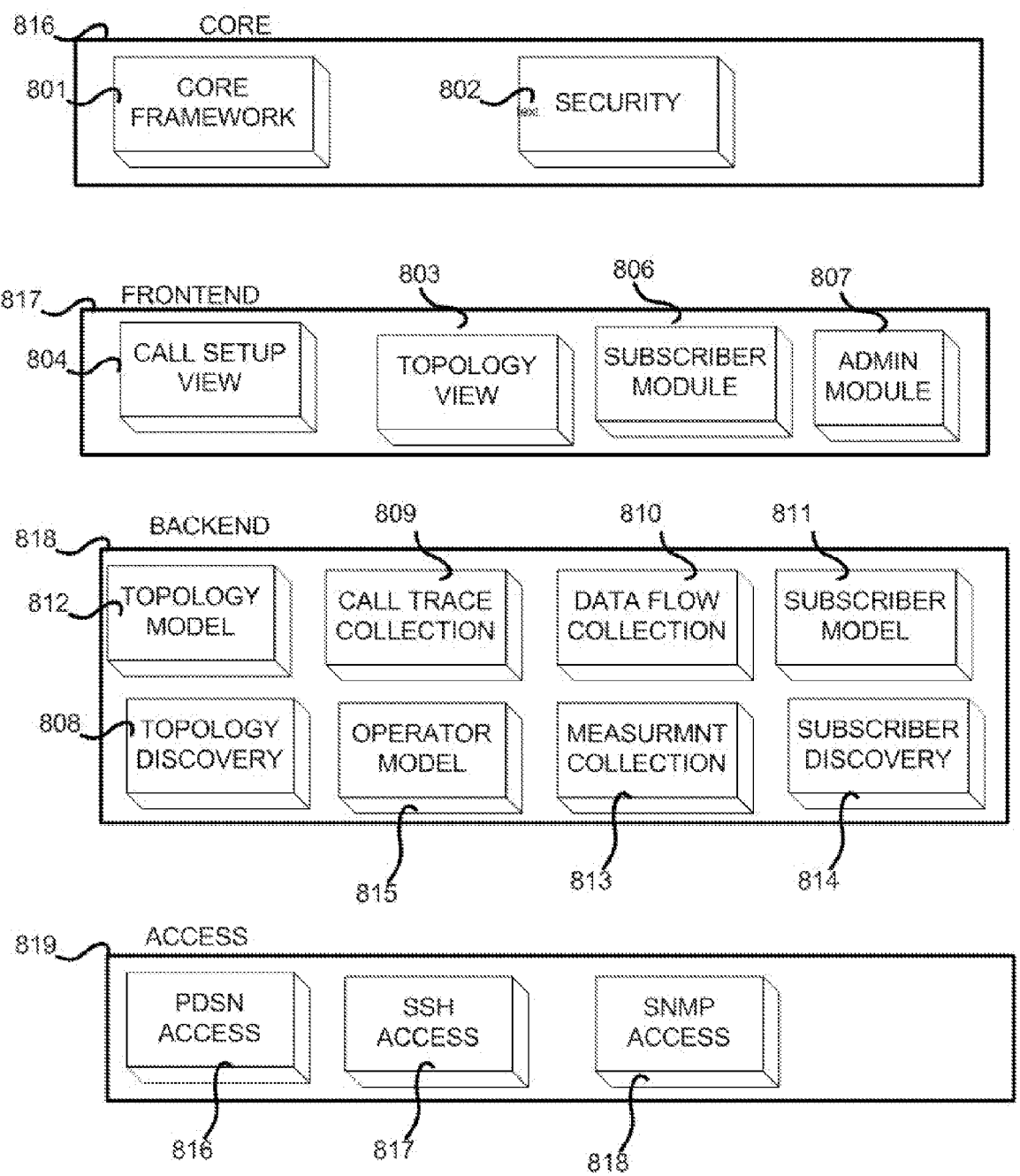
FIG. 8 illustrates an embodiment of the functional components of the invention.

As shown in FIG. 8, the product can be implemented as a set of functional modules. These modules are described as functional units; there is no implication that these modules must be physically separate components. For convenience, the functions are described in four logical areas; Core 816, Frontend 817, Backend 818, and Access 819. The Core functions 816 control the interactions between the operator and the apparatus, acting as a coordinator between the operator and the various other functions in the process. Frontend modules 817 are primarily modules which translate information received and processed from the EMS into operator display information. Backend modules 818 translate requests from the user into protocol-independent calls to the EMS and protocol-independent responses from the EMS into information for the Frontend modules to use to create displays. Access modules 819 are used to translate the protocol-independent requests into protocol-dependent ones, and visa versa.

The Core Framework 801 implements the UI controller functionality, to enable to user interface to communicate with the logic and which in turn communicates with the network elements of the service provider network via the EMS associated with each network element type.

The Security Module 802 provides control over access to the functions and configuration of the apparatus.

The Topology View Module 803 provides the translation of the service provider network information provided by the Topology Discovery Module 808 into information needed to display the Unified Service View of the service provider network.

The Call Setup Flow View Module 804 processes information to create a call setup display as shown in FIG. 7.

The Subscriber Info Module 806 tries to find the subscriber within a specific network using the Subscriber Discovery module 814. If the Subscriber Discovery 814 module locates a subscriber, it is either reported back to the display controller via the Core Framework 801 as a set of elements that the subscriber session is related to. If the subscriber could not be found in the area or areas of the service provider network, a notification is sent back to the display controller via the Core Framework 801.

The Admin Module 807 is used to handle application specific requests, like adding or modifying operators and creating or updating the configuration of network definitions.

The Topology Discovery Module 808 requests information from several network elements based on the Topology Model 812 to determine what subscriber-affecting and service-affecting nodes are active and how they are connected.

The Call Trace Collection Module 809 consists of a set of components which collects messages associated with a subscriber session and logs them. Messages associated with the Call Setup are routed to this module from the Access Modules 816. The Call Trace Collection Module 809 filters received messages associated with the desired subscriber(s) and then the remaining messages are correlated with each subscriber and the other messages associated with the call setup.

The Data Flow Collection Module 810 captures QoS data flows from the service-provider network. Appropriate messages from the Access Modules are routed to the Data Flow Collection Module and then to the QOS Data Flow View Module 805.

The Subscriber Discovery Module 814 uses the Subscriber Model 811 to find the subscriber in a given area or set of areas within the service provider network. The network elements associated with the subscriber as defined by the Subscriber Model 811 are queried to determine if the subscriber is actively using these elements.

The Subscriber Model 811 describes the environment around a subscriber as a set of elements. For example, a subscriber in a wireless network might be defined at any given time through a PDSN element, which in turn is linked to a specific HA and other elements. One embodiment is to define the model as a Common Information Model (CIM) model based on the Distributed Management Task Force (DMTF) Standard.

The Topology Model 812 consists of a set of data models which describe the generic model of a subscriber network to enable the views to be put together based on the presumed connectivity of the elements as defined by the model.

The Operator Model 815 is the model associated with the model-view-controller (MVC) definition of the various views displayed to the operator.

The Measurement Collection Module 813 collects data such as delay times to compare to threshold values preset by operators in stored configuration data. This data can then be used to determine if values are above threshold values and so create some error condition.

Access modules 819 translate protocol-independent requests into PDSN 820, SSH 821 and SNMP 822 requests and accept responses from those protocols and return protocol-independent responses. One or more embodiments of the PDSN Access module 820 is a special case of the SSH Access Module 821 but because it is critical it is given separate consideration.

Figure 9:
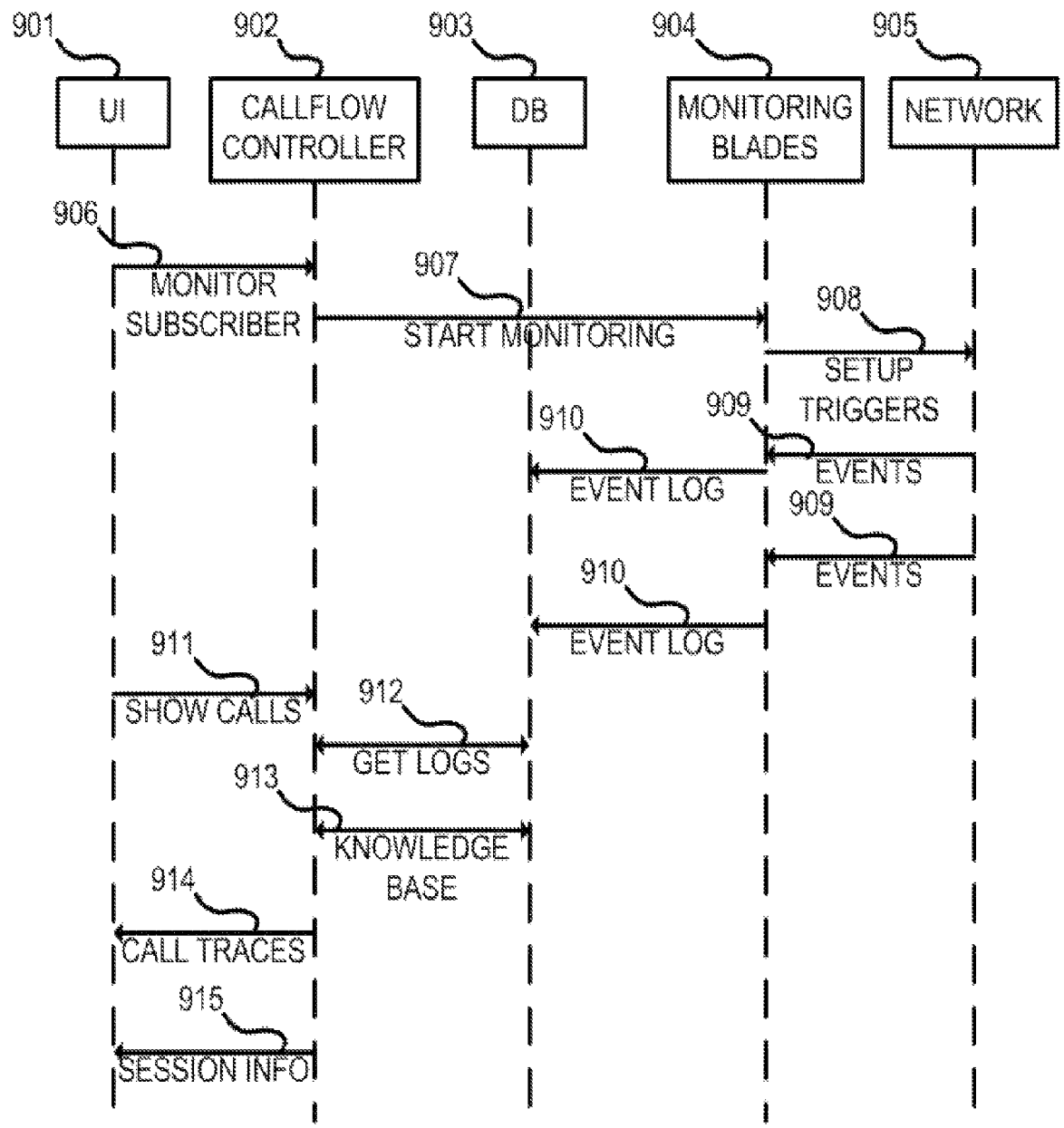
FIG. 9 illustrates the call flow processing sequence in accordance with one or more embodiments of the present invention.

FIG. 9 shows the call flow process. The operator selects the option on the user interface that requests a call setup for a subscriber. The UI 901 sends a request to the call flow controller 902 to monitor the subscriber 906. The Callflow Controller 902 then sends a message to the appropriate components in the monitoring controller 904 to start monitoring 907. The monitoring components 904 then send messages to the network elements in the service provider network 905 to setup triggers 908. As various events are sent back to the components based on these triggers 909, event logs are generated for each message 910 and placed in the event log data store 903. A request comes from the UI 901 to the Callflow Controller 902 at some later time to show the calls 911. In response, the Callflow Controller 902 sends queries to the event log in the datastore 903. If necessary, the Callflow Controller will call the knowledge database 913 to get the description, help and suggest fields associated with the message in the event log 903. The Callflow Controller will then correlate the messages and send them back to the UI in the proper sequence 914 along with the associated subscriber session information contained in the messages 915.

Figure 10:
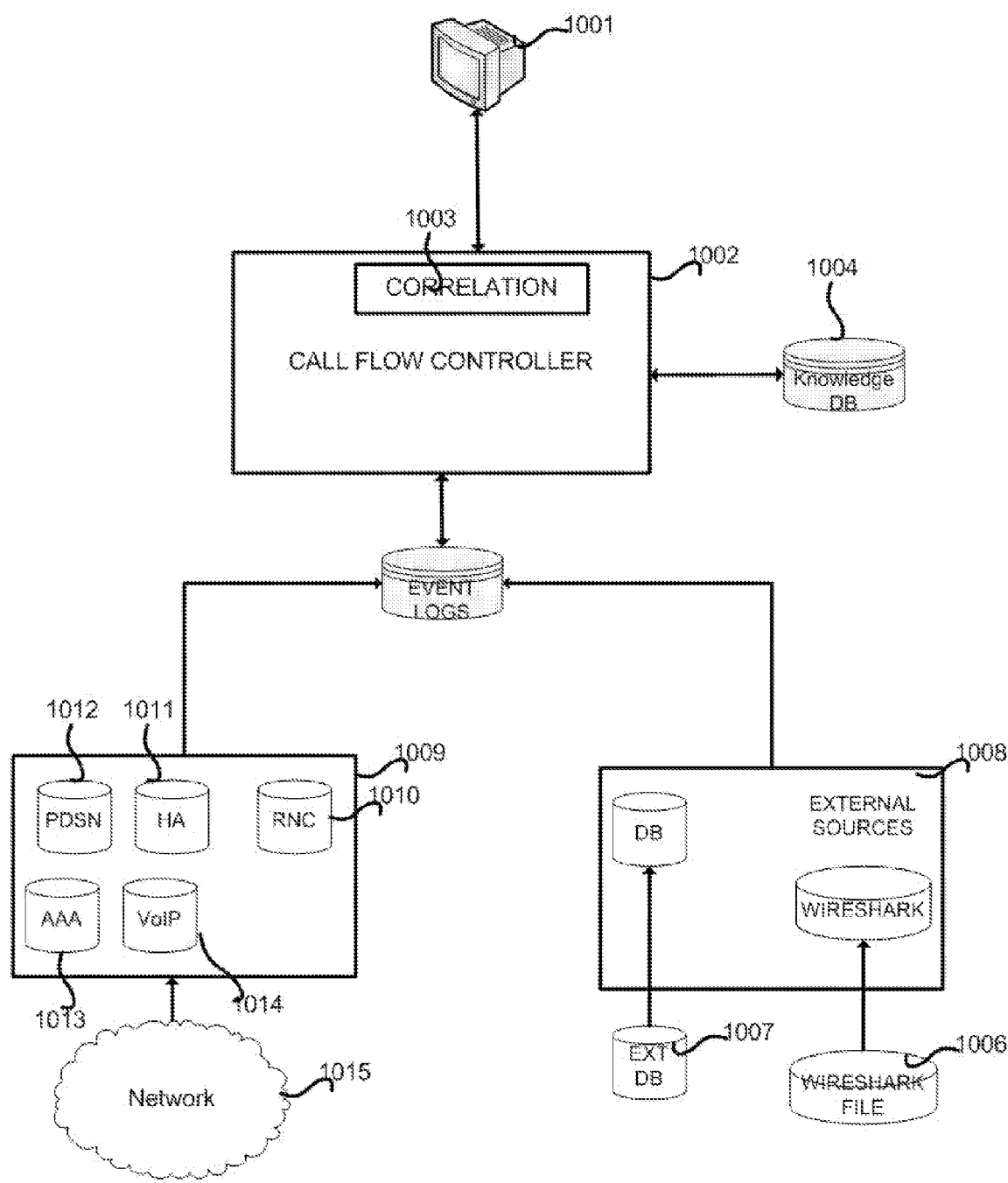
FIG. 10 illustrates a block diagram of the call flow information processing in accordance with one or more embodiments of the present invention.

The processing which occurs around the call setup flow is shown in FIG. 10. Data is collected from the network elements 1015 through various network sources 1009 via modules which capture messages to and from the PDSN 1012, HA 1011, RNC 1010, AAA 1013, and VOIP 1014. Messages may also originate from external sources, such as databases containing historical data or a file generated from a third party package to simulate message traffic. These messages are then routed to event logs 1005. Triggers may have been defined by one or more active operators to capture event log messages as they are being stored and sent to the Callflow Controller 1002. Other times, these messages may be requested from the Callflow Controller 1002 as a query against the existing Event Logs 1005. In either case, the logs go through a correlator 1003 which aligns messages based on their time relative to the occurrence of a any message known to be part of the call flow.

If there are failures in the messages, the messages are processed with the stored information in the knowledge database to match up the event code of the message, the element type and vendor of the EMS from where the message originated with the description, help, and suggest fields in the knowledge database.

Figure 11:
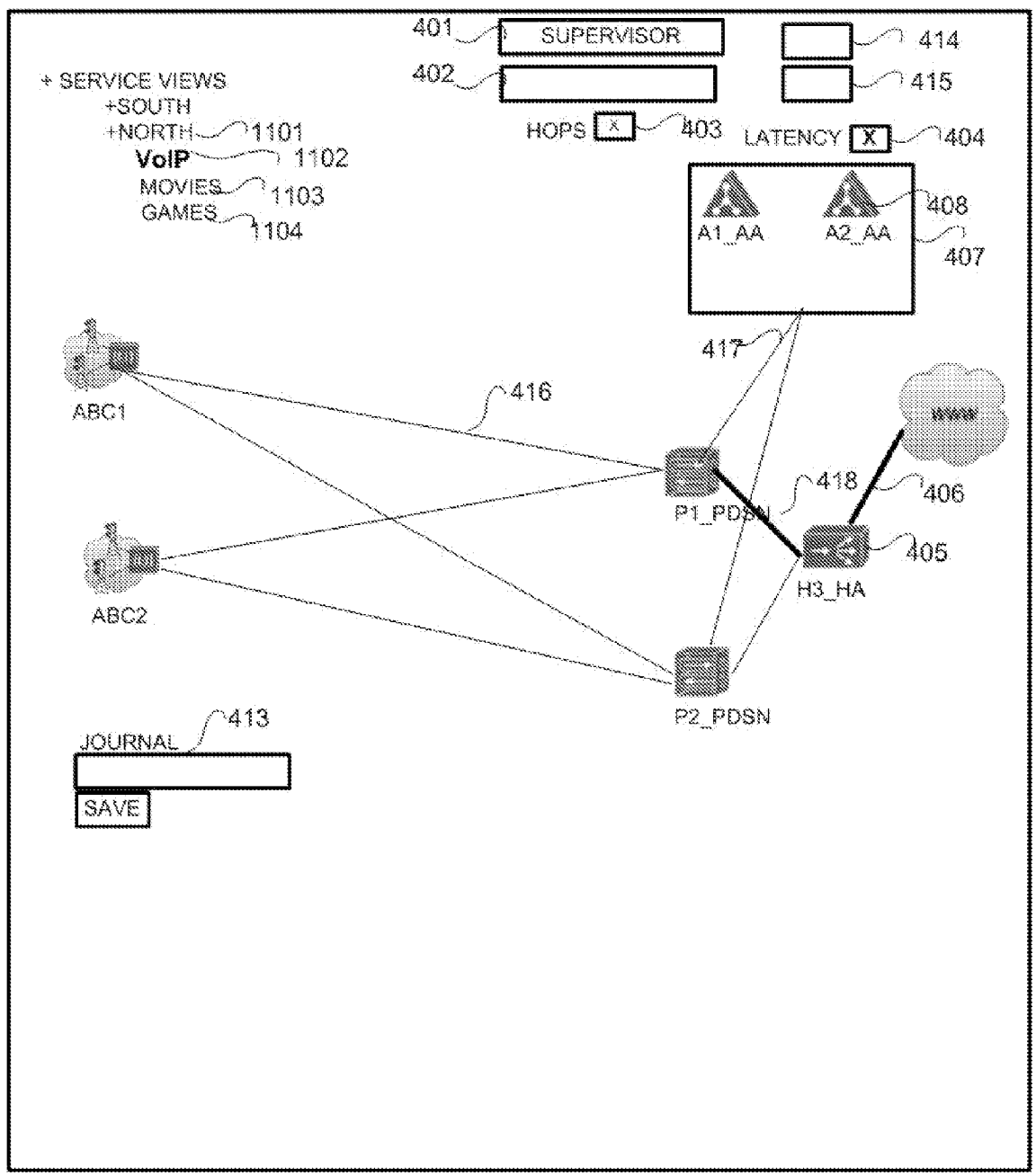
FIG. 11 illustrates a service view in accordance with one or more embodiments of the present invention.

FIG. 11 shows an embodiment of a service view. When the service view is selected, one may view the topology of the network within a specific geography or other segmentation of the network 1101, then select a particular service within that segmentation such as VoIP 1102, Movies 1103 or Games 1104. In this particular display, we show it as if VoIP 1102 was selected. In one or more embodiments, selecting a particular service from the list would cause the path through part of the network associated with that service to be emphasized 418, 406. In other embodiments, only that portion of the network associated with the particular service in that segment would be displayed.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

The invention claimed is:

1. A method for troubleshooting a call setup sequence of a subscriber session across Open Systems Interconnection (OSI) layers of a telecommunications network, the telecommunications network comprising a plurality of network elements, the call setup sequence comprising
   a plurality of call setup messages sent during call establishment, the method comprising:
   retrieving a status of a call setup message in the plurality of call setup messages, the call setup message being processed by a network element in the plurality of network elements during a processing period, wherein the network element is configured to store state information associated with a subscriber or service;
   retrieving a status of the network element during the processing period; and
   correlating the status of the call setup message with the status of the network element during the processing period;
   wherein correlating is associating the status of the network element with the status of the call setup message based on a proximity of time during the processing period, the correlating including using a result to determine if a malfunction of the subscriber session is due to a problem associate with the subscriber session or a problem associated with the network element.

2. The method in claim 1, further comprising:
   associating the plurality of call setup messages with an expected sequence of messages during the call establishment, wherein each message in the plurality of call setup messages is identified by a message type and the network element processing it, wherein the message type is one of the message types associated with a call setup;
   associating a threshold processing time with each message type;
   associating a threshold value or set of valid and invalid states with each Key Performance Indicator, wherein the Key Performance Indicator is associated with the network element type;
   associating a threshold status time between network element status reports for each network element type, such that if the network element of the network element type takes longer between status reports than the threshold status time, it is assumed that the network element is unavailable or too busy to process messages; and
   reporting the correlation of the status of all of the call setup messages ordered in the expected sequence of messages;
   wherein the report comprises:
   the processing time of each message,
   the status of each message processed, and
   the status of the network element processing each message at the time of the processing of each message;
   wherein the status of the network element comprises a comparison of each Key Performance Indicator value or state returned in the network element status with the threshold value or list of states, the time since the last network element status is greater than some predetermined value, or the network element sends out a notification that it has detected some error condition;
   wherein the status of each message comprises a status information contained in the message at least including an error code and a message processing time information.

3. The method in claim 2, further comprising:
   commanding each network element to send a notification when a message of the type associated with a call setup is processed;
   commanding each network element to return the values and state information associated with its Key Performance Indicators;
   storing the time and status associated with the message; and
   storing the values and state information returned for the network element;
   wherein each network element further comprises at least either a Command Line Interface or an Element Management System configured to accept commands.

4. The method in claim 3, further comprising:
   displaying the status of the message processed on a network element; and
   displaying the status of the network element processing the message at the time the message was processed;
   wherein the display of the status of the message and the status of the network element are configured so that a user would understand that the status are related to one another.

5. The method in claim 4, wherein the display of the status of the message is configured as the horizontal linear part of a timeline and the display of the status of the network element is configured as vertical milestones where the messages complete.

6. The method in claim 5, further comprising enabling the display of a status report associated with the status of the message.

7. The method in claim 6, further comprising enabling the configuration of the displayed status report to include a combination of:
   a textual description of the message processing status,
   a textual explanation of the status of the message,
   a recommended solution associated with the message error code, and
   a set of details of the message response.

8. The method in claim 7, further comprising:
   enabling an entry of a description of a solution associated with the error code; and
   storing the description of the solution associated with the error code and associating it with the error code;
   wherein the solution is displayed as a recommended solution when that error code is detected.

9. The method in claim 8, further comprising:
   signaling the user when the message processing time exceeds the threshold processing time associated with the message type of the message, when a notification is received that a timeout occurred on message processing, or when there is an error code indicating processing failure associated with a message; and
   signaling the user when any Key Performance Indicator in a network element status is at or above the threshold value or indicates an invalid state, when the network element has not returned a status for the threshold status time, or when the network element is reporting an error condition.

10. An apparatus configured for troubleshooting a call setup sequence of a subscriber session across Open Systems Interconnection (OSI) layers of a telecommunications network, the telecommunications network comprising a plurality of network elements, the call setup sequence comprising a plurality of call setup messages, the apparatus comprising:
   a computer, comprising a CPU, a memory, a facility for storage, and a communications interface coupled to a network;
   a first database coupled to the computer, said first database configured for at least storing status of a plurality of call setup messages, each status comprising an identifier for the network element processing the call setup message, a message type, an error code, a subscriber identifier, and a processing time information;
   a second database coupled to the computer, said second database configured for at least storing network element status information, the network element status information comprising a network element identifier, a timestamp, and one or more parameter values;
   a call trace collection module, coupled to the computer, configured to retrieve each of the call setup messages processed by each of the network elements, store the message status information in the first database, and to correlate the status of messages stored in the first database with the status of the network element processing the message stored in the second database;
   a data flow collection manager, coupled to the computer, wherein the data flow collection manager is configured to retrieve status information from the network element and store the status information associated with a specified set of network elements in the second database; and
   wherein correlating is associating the status of the network element with the status of the call setup message based on a proximity of time during the message processing period, the correlating including using a result to determine if a malfunction of the subscriber session is due to a problem associate with the subscriber session or a problem associated with the network element.

11. The apparatus in claim 10, the first database further comprising associating the plurality of call setup messages with an expected sequence of messages during a call setup, wherein each of the plurality of call setup messages is identified by a message type and said network element processing it.

12. The apparatus in claim 11, further comprising:
   a third database associating a threshold processing time with each message type, wherein a message type is one of the message types associated with a call setup;
   a fourth database associating a value or set of valid and invalid states with each Key Performance Indicator associated with each network element type;
   a fifth database associating a threshold status time between network element status reports with each network element type, such that if the network element of said network element type takes longer between status reports than the threshold status time, it is assumed that the network element is unavailable or too busy to process messages; and
   a sixth database associating an error code associated with a message type with a recommended solution to the problem associated with the error code.

13. The apparatus in claim 12, the call trace collection module further configured to report the correlation of the status of each of the call setup messages with the network element processing the call setup message, the correlation of the status ordered in the expected sequence of messages;
   wherein the report comprises:
   the processing time of each message,
   the status of each message processed, and
   the status of the network element processing each message at the time of the processing of each message;
   wherein the status of the network element comprises either:
   the value or state of each Key Performance Indicator value returned in the network element status, or
   a notification from the network element that it has detected some error condition;
   wherein the status of each message comprises: the status contained in the message including an error code, and the message processing time.

14. The apparatus in claim 13, further comprising:
   an access module, coupled to the call trace collection module and the data flow collection module, the access module configured to:
   command each network element to send a notification when a message of the type associated with a call setup is processed;
   command each network element to return the values and state information associated with its Key Performance Indicators;
   send the time and status associated with the message to the call trace collection module; and
   send the values and state information returned for the network element to the data flow collection module;
   wherein each network element further comprises at least either a Command Line Interface or an Element Management System configured to accept commands.

15. The apparatus in claim 14, further comprising:
   a call setup view manager coupled to the call trace collection module, the call setup view manager configured to:
   display status associated with the call setup message on a user interface; and
   display the status of the network element processing the call setup message at the time the call setup message was processed;

wherein the display of the status of the call setup message and the status of the network element are configured so that a user would understand that the statuses are related to one another.

16. The apparatus in claim 15, the call setup view manager further configured to:
   display the status of the message as the horizontal part of a timeline;
   display of the status of the network element is configured as the vertical milestones where the messages complete;
   display a status report associated with the message;
   enable the configuration of the status report to include any combination of:
   a textual description of the message processing status,
   a textual explanation of the status of the message,
   a recommended solution associated with the message error code, and
   a set of details of the message response;
   enable the entry of a description of a solution associated with the error code;
   store the description of the solution associated the error code and associating with the error code in the sixth database;
   signal the user when the message processing time exceeds the threshold processing time associated with the message type of the message, when a notification is received that a timeout occurred on message processing, or when there is an error code indicating processing failure associated with a message; and
   signal the user when any Key Performance Indicator in a network element status is at or above the threshold value or indicates an invalid state, when the network element has not returned a status for the threshold status time, or when the network element is reporting an error condition; wherein the solution is displayed as a recommended solution when that error code occurs.

17. A non-transitory computer-readable media having programming instructions for troubleshooting a call setup sequence of a subscriber session across Open Systems Interconnection (OSI) layers of a telecommunications network, the telecommunications network comprising a plurality of network elements, the call setup sequence comprising a plurality of call setup messages sent during call establishment, the media comprising:
   programming instructions to retrieve a status of a call setup message in the plurality of call setup messages, the call setup message being processed by a network element in the plurality of network elements during a processing period, wherein the network element is configured to store state information associated with a subscriber or service;
   programming instructions to retrieve a status of the network element during the processing period; and
   programming instructions to correlate the status of the call setup message with the status of the network element during the processing period;
   wherein correlating is associating the status of the network element with the status of the call setup message based on a proximity of time during the processing period, the correlating including using a result to determine if a malfunction of the subscriber session is due to a problem associate with the subscriber session or a problem associated with the network element.

18. The computer-readable media in claim 17, further comprising:
   programming instructions to associate the plurality of call setup messages with an expected sequence of messages during a call setup, wherein each message is identified by a message type and a network element processing it;
   programming instructions to associate a threshold processing time with each message type, wherein the message type is one of the message types associated with a call setup;
   programming instructions to associate a threshold value or set of valid and invalid states with each Key Performance Indicator associated with each network element type;
   programming instructions to associate a threshold status time between network element status reports for each network element type, such that if the network element of said network element type takes longer between status reports than the threshold time, it is assumed that the network element is unavailable or too busy to process messages; and
   programming instructions to report the correlation of the status of all of the call setup messages ordered in the expected sequence of messages;
   wherein the report of the correlation of the status comprises:
   the processing time of each message,
   the status of each message processed, and
   the status of the network element processing each message at the time of the processing of each message;
   wherein the status of the network element comprises either:
   each Key Performance Indicator value or a state information returned in the network element status, or
   a notification from the network element that it has detected some error condition;
   wherein the status of each message comprises: the status contained in the message including an error code, and the message processing time.

19. The computer-readable media in claim 18, further comprising:
   programming instructions to command each network element to send a notification when a message of the type associated with a call setup is processed;
   programming instructions to command each network element to return the values and state information associated with a Key Performance Indicator;
   programming instructions to store the time and status associated with the message; and
   programming instructions to store the values and state information returned for the network element;
   wherein each network element further comprises at least either a Command Line Interface or an Element Management System configured to accept commands.

20. The computer-readable media in claim 19, further comprising:
   programming instructions to display status associated with the message processed on a user interface;
   programming instructions to display the status of the message, and the status of the network element processing the message at the time the message was processed;
   programming instructions to enable the display of a status report associated with the message;
   programming instructions to enable the configuration of the displayed status report to include a combination of:
   a textual description of the message processing status,
   a textual explanation of the status of the message,
   a recommended solution associated with the error code, and
   a set of details of the message response;
   programming instructions to enable the entry of a description of a solution;

programming instructions to store the association of the description of the solution with the error code associated with the message;

programming instructions to signal the user when the message processing time exceeds the threshold processing time associated with the message type of the message, when a notification is received that a timeout occurred on message processing, or when there is an error code indicating processing failure associated with a message; and programming instructions to signal the user when any Key Performance Indicator in a network element status is at or above the threshold value or indicates an invalid state, when the network element has not returned a status for the threshold status time, or when the network element is reporting an error condition;

wherein the solution is displayed as a recommended solution when that error code occurs for any message of that message type;

wherein the display of the status of the message is configured as the horizontal linear part of a timeline and the display of the status of the network element is configured as vertical milestones where the messages complete.

* * * * *